United States Patent

Feterl

[15] 3,682,303
[45] Aug. 8, 1972

[54] MACHINE FOR CONTINUOUSLY REMOVING OVER-SIZED UNDESIRABLE MATERIAL FROM CROP MATERIAL MIXTURES

[72] Inventor: Leon G. Feterl, Salem, S. Dak. 57058

[22] Filed: April 3, 1970

[21] Appl. No.: 25,427

[52] U.S. Cl..................................209/243, 209/307
[51] Int. Cl............................B07b 13/16, B07b 1/10
[58] Field of Search......209/307, 308, 247, 261, 428, 209/470, 84, 92, 102, 272, 243, 405; 171/92; 198/104, 155, 158

[56] References Cited

UNITED STATES PATENTS

| 240,889 | 5/1881 | Compton | 209/92 |
| 391,281 | 10/1888 | Smith | 209/308 |
| 936,162 | 10/1909 | Pringle | 209/308 |
| 1,587,196 | 6/1926 | Soldan | 209/405 |
| 1,823,126 | 9/1931 | Ross | 209/307 |

FOREIGN PATENTS OR APPLICATIONS

| 2,731 | 12/1898 | Great Britain | 209/307 |
| 1,117,364 | 11/1961 | Germany | 209/92 |

*Primary Examiner*—Frank W. Lutter
*Assistant Examiner*—Robert Halper
*Attorney*—Williamson, Palmatier & Bains

[57] ABSTRACT

The machine is supported on a frame structure which includes a housing and has mounted within such housing a single, endless screening apron which has multi functions. The apron utilizes a plurality of flexibly connected, rectangular screening sections of a mesh quite coarse relative to the relatively regular shapes of the granular material to be saved, and substantially smaller than the coarse, undesirable trash material. The material mixture such as harvested crops including fragments of stalks, leaves, pods, cobs and so forth which in harvesting are intermingled with the desirable granular crop material, is constantly fed axially into a loop portion of one end of the said apron, wherein travel of the apron and at the bottom of the loop portion, the smaller granular material readily flows through and is dropped from the coarse mesh. The over-sized material travels past this point and then over a serpentine or tortuous course which causes the pans to spread widely apart, dropping the trash material at a predetermined area.

5 Claims, 3 Drawing Figures

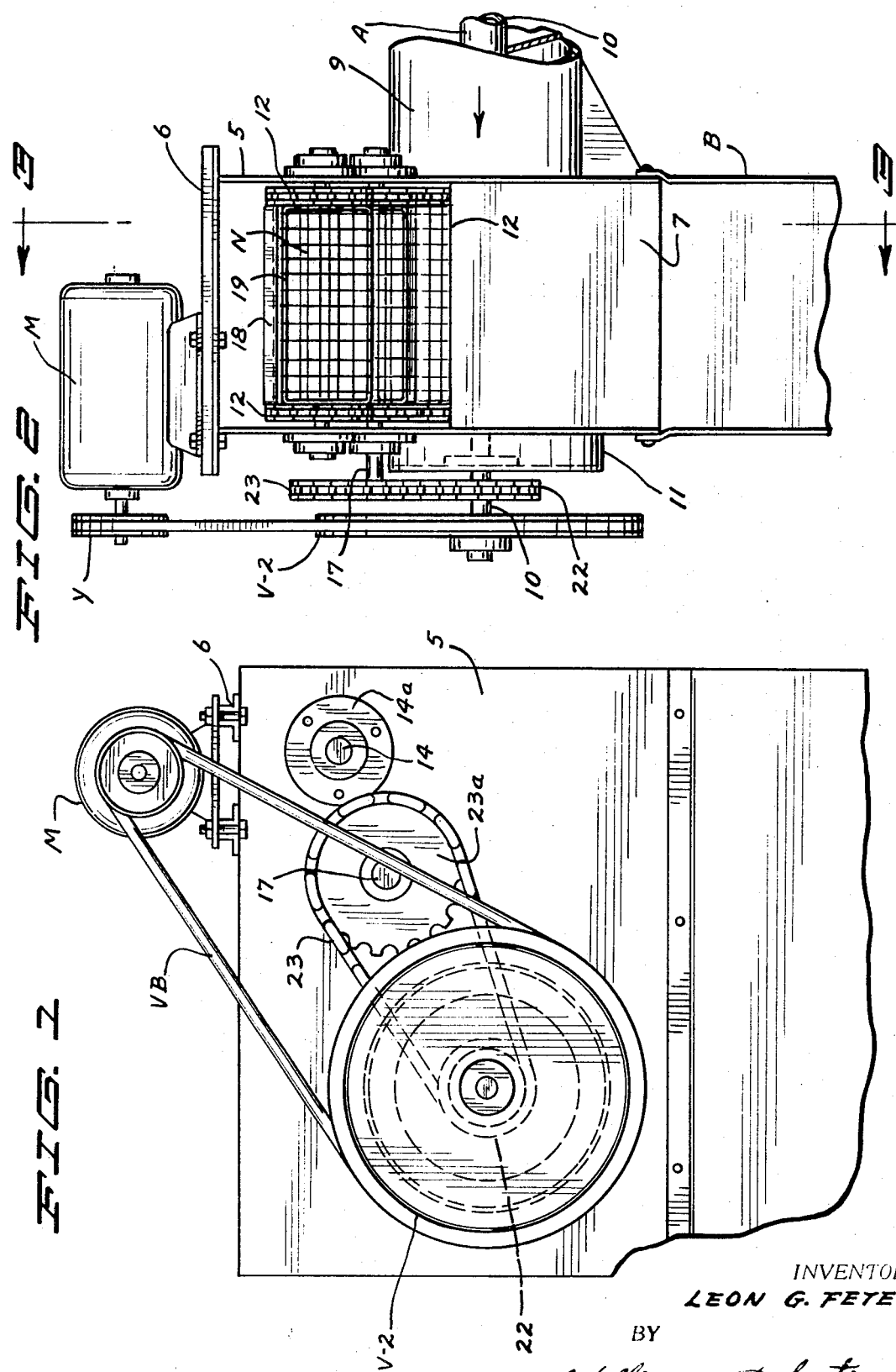

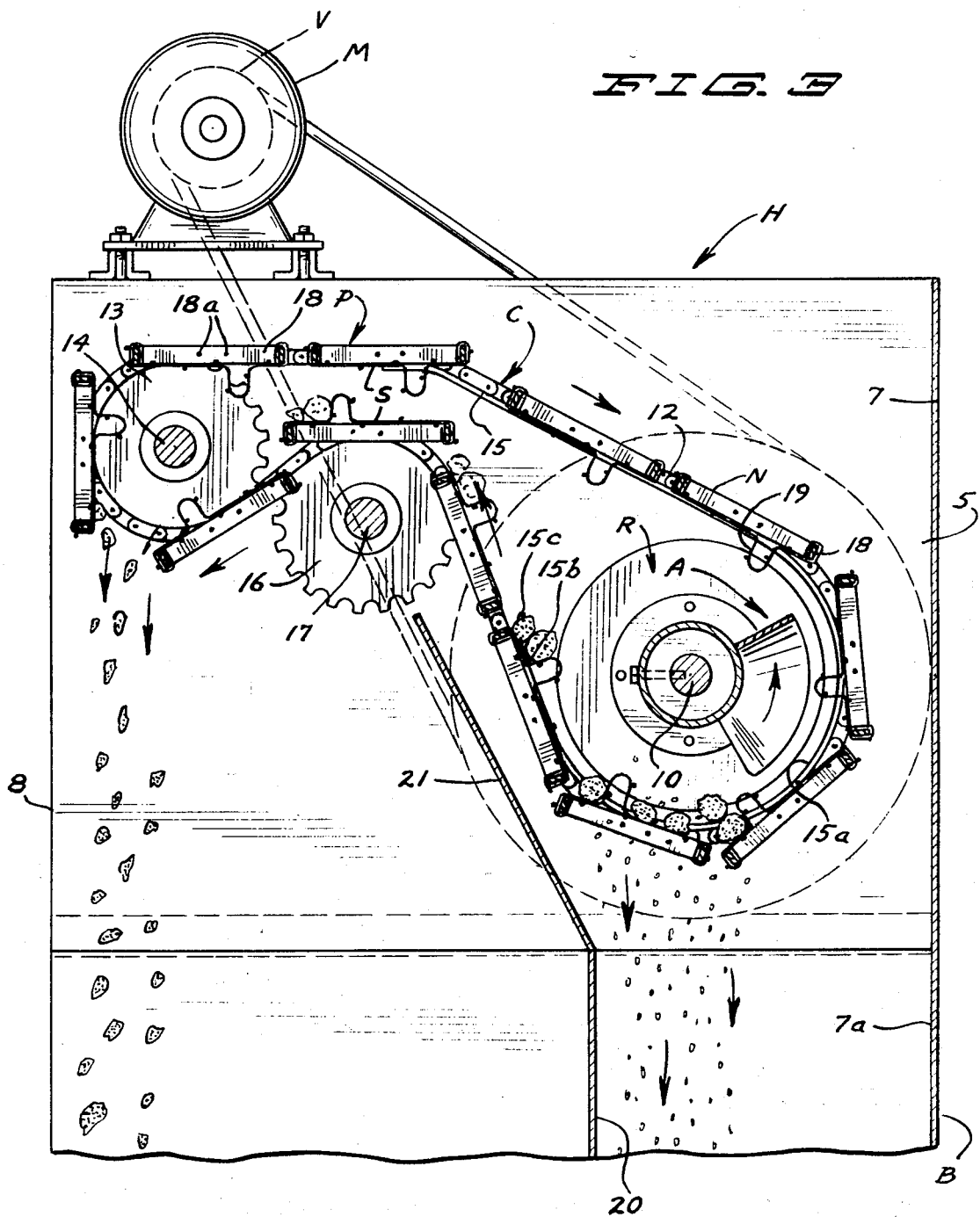

3,682,303

MACHINE FOR CONTINUOUSLY REMOVING OVER-SIZED UNDESIRABLE MATERIAL FROM CROP MATERIAL MIXTURES

This invention relates to a machine for readily and quite uniformly separating and removing oversized, undesirable material from smaller, substantially regular granular material such as the grains of food crops including soybeans, sorghum, shelled corn, oats and the like.

In the present day harvesting of many crops, including those previously specified herein, materials generally classified as trash, including fragments of stalks, pods, leaves, vines and straw, in substantial quantity are usually admixed with the granular seeds, grain and the like which constitute the desirable crops harvested.

THE PRIOR ART

The prior art known to this applicant includes a number of mechanical separating machines which, for the most part, act on principles of separation of the smaller and heavier desirable particles from a mass through centrifugal force, screens and selective pick up devices. In some instances, as in separation of potatoes from clods and vines, the vines and clods are passed in a line of travel on a classifying conveyor moving rearwardly while the potatoes are passed through rods or mesh of a chosen dimension.

In some prior structures electrostatic separators have been used to pick off and remove lighter materials, such as straw, chaff and fibrous materials, which are more susceptible to a magnetic influence.

None of the prior art, to my knowledge, has employed simple operating mechanism for quickly treating the discharge from harvesting machinery to take out fragments of stalks, pods, leaves, cobs, vines, straw and the like at high capacity, and to leave the finer desirable granular material fully classified or at least ready for a finer classification treatment.

OBJECTS OF THE INVENTION

It is an object of my invention to provide an economical simple machine which will continuously separate out and remove over-sized, undesirable material from regular granular materials such as the grains of food crops, by utilization of a single, endless and multi-functional screening apron which in operation at one end of the machine, internally receives the admixture including trash material such as stalk portions, leaves, vine portions and cob fragments, while letting pass the finer crop granules or grains and which in a subsequent operation of the same apron, discharges and dumps out the trash material into suitable collection means.

A further object is the provision of a machine of the class described which employs as an endless apron, a multiplicity of flexibly or chain-connected screen sections in the form of rectangular bodies or pans, in combination with a means for guiding and distending said endless apron to form a material-receiving, semi-cylindrical forward portion in the machine wherein harvested crops containing desirable granular material and trash are constantly fed; and with further guiding of the apron through a tortuous or sinuous course which inherently causes the pan sections after original discharge of the desirable crop or granular material, to be spread apart over an area of travel, thereby dumping out the coarser, undesirable material before the apron has traveled to its next receiving position.

Important features and novel combinations of my invention include the provision for continuously feeding material such as harvested crops which contain in admixture the rather regular shaped granules or seeds intermingled with trash material including fragments of stalks, leaves, vines, cobs, etc., into the axial end of a screening chamber defined by a substantially cylindrical portion of a single, endless separating apron. The apron is composed of a multiplicity of flexibly connected and pan-shaped separation screens of relatively large mesh to enable small regular kernels of granules to readily drop therethrough while retaining the said over-sized trash materials. Thus almost immediate removal of the granular crop particles is obtained while the same apron causes the over-sized materials to travel rearwardly and then through a serpentine course which causes the pans to separately and in pairs, spread widely apart for depositing and discharging the trash at an area removed from the crop discharge.

The foregoing and other objects will be more apparent from the following description made in connection with the accompanying drawings wherein:

FIG. 1 is a side elevation of an embodiment of the machine showing the standing housing and supporting frame with the driving mechanism and connections for the various driven shafts of the machine;

FIG. 2 is a front elevation with the top of the housing removed, showing a plurality of the separation units with coarse screens mounted thereon, and showing the guided endless roller chains which constitute portions of the apron; and FIG. 3 is a vertical cross section taken on the line 3—3 of FIG. 2 illustrating the guiding and distension of the roller chains of the apron.

Referring now in detail to the form of the invention illustrated in the drawings, an upstanding housing, for the main part constructed of heavy sheet material, indicated generally by the letter H, and with reinforcements constituting the supporting frame of the structure is provided, having spaced vertical side walls 5, a heavy top wall 6, a vertical forward wall 7 and a rear wall 8. This main housing H, as shown, is supported upon and above a lower base housing of rectangular form, indicated as an entirety by the letter B. The forward and lower portion of housing H, as later will be brought out in detail, constitutes a material-receiving chamber, indicated generally as R, and has communicating therewith, through one of the side walls 5, a large tubular conduit which has axially and longitudinally mounted therein an auger or screw conveyor A, the flights of which are rigidly secured to a driven shaft 10. Shaft 10 has a diminished outer end extending through the said receiving chamber and through the opposite wall 5 of the housing, and a large circular closure cap 11, as shown, surrounds the terminal portion of the shaft 10; closure 11 being removably affixed to one of the side walls 5 of the housing.

An endless driven conveyor apron, indicated as an entirety by the letter C, is mounted between the side walls 5 of the housing and in width occupying substantially the space between said side walls and is supported, distended and entrained upon essential supporting elements in a unique manner to combinatively produce several functions during the travel of the conveyor apron.

In the form shown, conveyor apron C is transversely mounted between two endless roller chains 12 spaced apart the full width of the conveyor C. These two endless roller chains 12 at their rear loop portions are entrained upon a pair of widely spaced idler sprockets 13 journaled for smooth rotation upon a transverse idler shaft 14 affixed between the side walls 5 of the housing towards the rear thereof and at an axial line substantially above the height of the axis of auger shaft 10. The roller chains 12, as shown on their forward declined portions or runs thereof, are supported and guided by stationary slide tracks 15 respectively secured in opposed relation to the inner sides of the housing walls 5. Slide tracks 15, as clearly shown in FIG. 3, have declined forward portions which tangentially merge into semicircular continuous track sections 15a, which extend concentrically and slightly outwardly of the interior of the delivery end of the screw conveyor or auger conduit 9. The semicircular track sections 15a terminate in straight sections 15b having terminal inturned extremities 15c. The roller chains 12 of the conveyor apron are entrained over the upper portions of a pair of driving sprockets 16 which are affixed to a driven shaft 17 extending transversely of the housing H and disposed between the idler shaft 14 and the conveyor shaft 10. The driving sprocket 16 and upper peripheries extend some distance above the lower peripheries of the idler sprockets 13, so that the roller chains 12 in their entrainment over the two sets of sprockets 16 and 13 have serpentine or tortuous portions, as clearly shown in FIG. 3.

While various screen structures or mesh may be employed as essential to the separating conveyor formed by the apron, in the form disclosed I provide a multiplicity of generally rectangular separating pans, generally indicated as P, and each of which consists of a rectangular frame structure of substantially rigid construction having opposed side walls 18 which are attached by pins 18a to one of the roller chain sections. Thus the pan frames traverse the two endless chains 12 and are fixedly connected therewith and preferably have widths substantially greater than the traveling lengths of the pans.

Suspended and stretched across the pan frames, and each thereof, is a coarse screening sheet S, which may constitute heavy crossed or other wire screening or might be in the form of expanded metal. Each of the pan structures includes a transverse strut 19, which may be constructed of angle iron, but which is preferably made, as shown in FIG. 3, by forming a 180° bend in screening sheet S. Strut 19 traverses the two sides 18 of the pan and has its outer edge disposed above the outer end edges of the pan frames. Strut 19 is preferably positioned one-third of the traveling length of the pan from the leading edge thereof. The coarseness of the mesh of the pad screen S may be seen from FIG. 2 and will of course vary somewhat in accordance with the particular crop materials which are to be worked upon. For the majority of materials of harvested crop containing oversize trash, a linear mesh of about one inch square is suggested and suitable.

The entire conveyor apron C is confined within the housing H and, as shown in FIG. 3, a descending enlarged spout comprising the front wall of housing 7 and the upstanding front wall 7a of the base housing, together with the vertical wall 20 which at its upper end has affixed an inclined spout section 21. The walls 20 and 21 preferably traverse the full width of the lower portion of housing H and form a descending downwardly tapered spout underlying the lower portion of the endless conveyor apron C, and receiving therefrom the finer granular and crop materials.

The several revolving parts of the machine may of course be driven in various ways, but as shown an electric motor is mounted on the heavy rear end of the top 6 of the housing having a V-belt pulley Y affixed to the outwardly projecting end of the armature shaft thereof, which is drive connected by a V-belt VB with a greatly enlarged V-belt pulley V-2 affixed to the diminished projecting end of the auger shaft 10, as seen in FIG. 2. Thus the auger A is driven at a substantially decreased rpm relative to the motor M. The extension of shaft 10 outside of the housing carries a small driving sprocket 22 over which an open driving chain 23 is trained. Chain 23 is also trained about sprocket 23a affixed to transverse driven shaft 17 which actually, through the affixed chain sprockets 16, drives the endless conveyor and separating apron C in the direction indicated in FIG. 3.

The shaft 14 of the idler sprocket 13 is suitably journaled in bearings provided at the exterior of the housing sides 5, one of said bearings 14a being shown in FIG. 1.

From the foregoing description of the exemplary driving mechanism shown, it will be seen that the shaft 17, to which are affixed the chain sprockets 16, is driven at a relatively low speed and these sprockets act as the sole driving means for the conveyor and separating apron C, which, as previously set forth, carries a multiplicity of transverse pan-like separators, the medial portions of which are affixed to two opposing sets of links of the roller chain.

OPERATION

In operation, the screw conveyor comprising the large tubular conduit 9 with the screw auger A revolvably mounted therein receives material from a hopper or the discharge end of a harvester for crops and takes the entire mass of the harvested discharge metering in its conveying this mass axially into the portion of housing H which is surrounded by the semicylindrical portion of the conveyor apron C (to wit, that portion which is marked as the receiving portion R, see FIG. 3).

The mass material containing a considerable proportion of oversize, trash fragments, such as stalk, pod, broken cobs, leaves and vines, remains on the interior of the conveyor apron C, and although in its entrainment upon the guide tracks 15 and sections 15a and 15b due to the curvature of section 15a, the opposing ends of adjacent pan separation elements are spread apart some small distance. This distance, at such portion of the machine, is not sufficient to enable the said oversize fragments to drop therethrough. However, with the coarse screening S of the multiplicity of pans, the more regular shaped crop material in granular ovoid and kernel form readily works through and drops through the rather loose over-sized material and such dropping and discharge occurs, as shown in FIG. 3, in the upper end of the discharge spout. Thereafter, the oversized material still remains within the confines of the container apron and passes over the top portions, at its edges, of the driving sprockets 16 for the chains. Thereafter the chains and the apron pass through a tortuous course beneath the idler sprockets 13, which are at least as small, and preferably slightly smaller in diameter, than the driving sprockets 16. In such sharp circular travel, the opposing edges of adjacent pans are spread very widely apart and to such a great distance that the oversized material, as indicated by the arrows and representations of coarse material at the lefthand of FIG. 3, drops downwardly and is suitably collected by means or a trough at the bottom portion of the housing.

The foregoing operation takes place rapidly because of the constant, substantially metered feeding of the admixed materials and because the mesh of the screening is very large relative to the size and shapes of the crop granules. Furthermore the oversized trash materials confined in the screening apron are very quickly removed after the granule-removal step by the wide spread-apart action of the screen pans in passing through the tortuous course rearwardly disposed of the material-receiving chamber R.

The invention is widely applicable for many uses in agricultural and also other fields where it is desirable to, without shaking or thresher action, and without the necessity of aspiration or suction, quickly remove from a loose mass of material containing valuable granular or quite regular shaped particles, admixed with substantially oversized particles, to separate the said classes and entirely remove the grossly over-sized particles or trash from the admixture. In agricultural use, the device is particularly adaptable for rapid recovery of the desirable regular shaped crop particles in crops such as soy beans, corn, oats, sorghum and cereal grains. In numerous instances, at least some of such crops require one or more final steps of classification to obtain the choicest crop granules or seeds. With my improved structure, the trash and relatively long fragments, including pods, cob and stalk fragments, leaves and vines may be quickly contained, traveled and removed prior to which time the quite regular shaped crop particles drop out from the trash material and through the relatively large sizing screens.

From the foregoing description it will be seen that my improved machine not only in the specific form illustrated but in other equivalent forms, may be constructed inexpensively, and will function with high efficiency for all of the purposes intended.

It will further be seen that an important feature of my machine is the use of a single material-carrying and sizing endless apron with the means for guiding the same about a substantially cylindrical receiving portion through which mixed material may be continuously fed, enabling through the sizing of the material, the granules to readily pass through the bottom of the said cylindrical portion; together with the multi-function of this same apron with a multiplicity of flexibly joined, rectangular screen pans to continuously go through a tortuous course which causes the individual screens or pans to spread widely apart for dropping out and removing the trash or oversized material soon after separation and removal of the valuable regular crop materials.

What is claimed is:

1. A machine for separating out and removing oversized, undesirable material from admixed, substantially regular or granular crop material, having in combination:

a supporting frame structure, a driven endless screening apron mounted transversely in said frame structure and including a plurality of rectangular screening sections having screening of a mesh very coarse relative to the shapes and sizes of the granular material to be saved, and substantially smaller than the oversized, undesirable material, means for guiding and distending said apron to form adjacent one end of said machine, a generally cylindrical mixture-receiving portion, means for feeding the admixed material axially into said receiving portion, means below and extending slightly to the rear of said cylindrical receiving portion into which the finer and substantially regular granular material drops through the mesh of said screening sections, means operable upon the under run of said apron and disposed substantially rearwardly of said receiving portion for causing said separate screen units to be temporarily spread widely apart, thereby dumping out the coarse material contained in said apron, means for continuously driving said screening apron at predetermined speeds, means for continuously feeding the admixed material at a predetermined speed relative to the speed of said apron, said apron including a pair of widely spaced, endless chains across which said screening sections are affixed, said means for guiding and distending said apron to form said generally cylindrical mixture-receiving portion being of substantially large diameter to maintain the adjacent edges of successive screens about said receiving portion in relatively close spaced relation, and said means for temporarily spreading said screen unit widely apart, comprising two sets of distending and guiding means for said chains, causing said chains and the screen units carried thereby to pass through tortuous arcuate portions in the travel of said apron at its under run substantially rearwardly of said receiving portions.

2. The structure and combination set forth and defined in claim 1, wherein said means for distending and guiding the said two chains through said tortuous arcuate course comprises a pair of sprockets of lesser diameters than the diameter of said receiving portion of said apron and having upper peripheral edges disposed substantially above the lower peripheral edge of said receiving portion of said apron, together with sprockets disposed rearwardly of said first sprockets, also of substantially smaller diameter than the diameter of said receiving portion, and having under peripheries disposed substantially below the upper peripheries of said first set of sprockets, whereby in travel under said second set of sprockets, the plurality of screening sections will be substantially angulated and thus spread to cause discharge of the undesirable, oversized material through spaces between said screening units.

3. The structure and combination set forth and defined in claim 1, wherein said screening sections each comprise an open work, substantially rigid rectangular frame, a netting secured to and extending across said frame and a transverse strut bar secured across said frame and extending outwardly beyond one edge thereof to distend the netting transversely along a line disposed rearwardly of the leading edge thereof.

4. A machine for separating out and removing oversized, undesirable material from admixed, substantially regular or granular crop material, having in combination:

a supporting frame structure,
a driven endless screening apron mounted transversely in said frame structure and including a plurality of rectangular screening sections having screening of a mesh very coarse relative to the shapes and sizes of the granular material to be saved, and substantially smaller than the oversized, undesirable material,
a first means for guiding and distending said apron to form adjacent one end of said machine, a generally cylindrical mixture-receiving and screening portion,
means for feeding the admixed material axially into said receiving portion,
particle-receiving means below and extending slightly to the rear of said cylindrical receiving portion into which the finer and substantially regular granular material drops through the mesh of said screening sections,
said means for guiding and distending said apron to form said generally cylindrical mixture-receiving portion being of substantially large diameter, adequate to maintain the adjacent edges of successive screening sections about said receiving portion in close spaced relation, and
a second apron-guiding and distending means operable upon the under run of said apron and substantially rearwardly disposed of said mixture-receiving portion and being of relatively small diameter to cause said separate screen sections to temporarily spread widely apart, thereby dumping out the coarse material contained in said apron.

5. The structure and combination set forth in claim 4 further characterized by means for continuously driving said screening apron at predetermined speeds, means for continuously feeding the admixed material at a predetermined speed relative to the speed of said apron, said apron including a pair of widely spaced, endless chains across which said screening sections are affixed.

* * * * *